(12) United States Patent
Malladi et al.

(10) Patent No.: US 8,761,782 B2
(45) Date of Patent: Jun. 24, 2014

(54) BROADCAST CHANNEL FOR E-UTRA

(75) Inventors: Durga Prasad Malladi, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 939 days.

(21) Appl. No.: 11/742,590

(22) Filed: Apr. 30, 2007

(65) Prior Publication Data

US 2008/0072269 A1   Mar. 20, 2008

Related U.S. Application Data

(60) Provisional application No. 60/795,963, filed on Apr. 28, 2006.

(51) Int. Cl.
*H04W 72/04* (2009.01)
*H04W 48/12* (2009.01)

(52) U.S. Cl.
CPC .................................. *H04W 48/12* (2013.01)
USPC ...................... 455/450; 455/552.2; 370/468

(58) Field of Classification Search
USPC ............. 370/337, 390, 395.41, 468; 455/450, 455/452.2, 266
See application file for complete search history.

(56) References Cited

U.S. PATENT DOCUMENTS

| | | | |
|---|---|---|---|
| 6,173,005 B1 * | 1/2001 | Kotzin et al. | 375/141 |
| 6,246,698 B1 * | 6/2001 | Kumar | 370/487 |
| 6,549,592 B1 | 4/2003 | Jones | |
| 6,577,613 B1 * | 6/2003 | Ramanathan | 370/337 |
| 7,092,437 B2 * | 8/2006 | Chen et al. | 375/231 |
| 7,203,158 B2 * | 4/2007 | Oshima et al. | 370/208 |
| 7,260,764 B2 | 8/2007 | Chen | |
| 2001/0050926 A1 * | 12/2001 | Kumar | 370/529 |
| 2002/0106987 A1 * | 8/2002 | Linden | 455/12.1 |
| 2003/0093546 A1 | 5/2003 | Roy et al. | |
| 2003/0147390 A1 * | 8/2003 | Rizzo et al. | 370/390 |
| 2004/0246998 A1 * | 12/2004 | Ma et al. | 370/527 |
| 2006/0048208 A1 * | 3/2006 | Sibley et al. | 725/153 |
| 2006/0143677 A1 * | 6/2006 | Weiss | 725/117 |
| 2006/0148408 A1 * | 7/2006 | Cho et al. | 455/67.7 |
| 2007/0218841 A1 * | 9/2007 | Wright | 455/63.3 |

FOREIGN PATENT DOCUMENTS

| | | |
|---|---|---|
| CN | 1371576 | 9/2002 |
| CN | 1732645 | 2/2006 |
| EP | 1033830 A1 | 9/2000 |
| EP | 1579616 A2 | 9/2005 |

(Continued)

OTHER PUBLICATIONS

Sun, Y. et al.: "Cellular SFN Broadcast Network Modeling and Performance Analysis", Vehicular Technology Conference, 2005. VTC-2005-Fall. 2005 IEEE 62nd Dallas, TX, USA Sep. 25-28, 2005, Piscataway, NJ, USA, IEEE, Sep. 25, 2005, pp. 2684-2690, XP010879050, ISBN: 0-7803-9152-7.

(Continued)

*Primary Examiner* — Cong Tran
(74) *Attorney, Agent, or Firm* — John J. Ketchum (57) ABSTRACT

Systems and methodologies are described that facilitate optimal transmission of system parameter data in a wireless communication system. According to various aspects, a broadcast channel is split into at least two portions, wherein one portion allows for transmission of static system parameter data at a first data rate, and a second portion allows for transmission of semi-static and dynamic parameter data at a second disparate data rate.

49 Claims, 9 Drawing Sheets

(56) References Cited

FOREIGN PATENT DOCUMENTS

| | | |
|---|---|---|
| JP | 4117822 A | 4/1992 |
| JP | 2002535920 A | 10/2002 |
| JP | 2005086818 A | 3/2005 |
| KR | 20050045223 A | 5/2005 |
| RU | 2209521 C1 | 7/2003 |
| WO | WO0044122 | 7/2000 |
| WO | 0072609 | 11/2000 |
| WO | 2005071867 | 8/2005 |
| WO | 2005109705 | 11/2005 |
| WO | WO-2005122517 A1 | 12/2005 |
| WO | 2007059385 | 5/2007 |
| WO | 2007091795 | 8/2007 |
| WO | 2007108630 | 9/2007 |

OTHER PUBLICATIONS

International Search Report, PCT/US07/067828—International Search Authority—European Patent Office—Jan. 28, 2008.

Written Opinion—PCT/US07/067828—International Search Authority, European Patent Office—Jan. 28, 2008.

LG Electronics: "Consideration on BCH and 20 MHz system BW," 3GPP Draft; R2-060903_SCH_BCH_JOINTS 3.1, 3RD Generation Partnership Project (3GPP), Mobile Competence Centre; 650, Route des Lucioles; F-06921 Sophia-Antipolis Cedex; France, vol. RAN WG2, no. Athens, Greece; Mar. 23, 2006 , XP050130844 [retrieved on Mar. 23, 2006].

3GPP Draft; TR 102277V010101 P, 3rd Generation Partnership Project (3GPP), Mobile Competence Centre; 650, Route Des Lucioles; F-06921 Sophia-Antipolis Cedex; France,val. RAN WG4, no. Prague, Czech Republic; Aug. 12, 2004, XP050173341,[retrieved on Aug. 12, 2004].

European Search Report—EP11167656—Search Authority—Munich—Feb. 16, 2012.

Taiwan Search Report—TW09611520913 TIPO—Dec. 13, 2011.

\* cited by examiner

BROADCAST CHANNEL FOR E-UTRA

CROSS REFERENCE TO RELATED APPLICATION

This application claims the benefit of U.S. provisional application Ser. No. 60/795,963, filed on Apr. 28, 2006, and entitled A BROADCAST CHANNEL FOR E-UTRA. The entirety of this application is incorporated herein by reference.

BACKGROUND

I. Field

The following description relates generally to wireless communications, and more particularly to systems and methods for transmitting system parameter data at optimal data rates.

II. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TAMI) systems, frequency division multiple access (FDMA) systems, and orthogonal frequency division multiple access (OFDMA) systems.

Wireless communication systems have become a prevalent means by which majority of people worldwide have come to communicate. Wireless communication devices have become smaller and more powerful in order to meet consumer needs, improve portability and convenience. The increase in processing power in mobile devices such as cellular telephones has lead to an increase in demands on wireless network transmission systems.

A typical wireless communication network (e.g., employing frequency, time, and code division techniques) includes one or more base stations that provide a coverage area and one or more mobile (e.g., wireless) terminals that can transmit and receive data within the coverage area. A typical base station can concurrently transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams carried by the composite stream. Likewise, a mobile terminal can transmit data to the base station or another mobile terminal.

In many instances, system parameter data must be transmitted to cells within a wireless communication network and to user equipment (UE). Some system parameter data is needed generally among all cells, while some data is specific to one or more particular cells within the network. A common occurrence is inefficient transmission of system parameter data as a result of sending all types of different parameter data using the same delivery mechanism. Therefore, a need in the art exists to improve data rate transmission of system parameter data by splitting a data broadcast channel as a function of the type of parameter data involved.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with an aspect, a method that facilitates broadcast channel operation, comprising: splitting a broadcast channel into a plurality of portions, the plurality of portions comprising at least primary broadcast parameters and secondary broadcast parameters, transmission bandwidth of the primary broadcast parameters is less than or equal to the transmission bandwidth of secondary broadcast parameters.

In accordance with an aspect, a system that facilitates broadcast channel operation, comprising: means for analyzing data to be transmitted; and means for splitting a broadcast channel into a plurality of portions, the plurality of portions comprising at least primary broadcast parameters and secondary broadcast parameters, transmission bandwidth of the primary broadcast parameters is less than or equal to the transmission bandwidth of secondary broadcast parameters.

In accordance with an aspect, a computer readable medium having stored thereon computer executable instructions for carrying out the following act(s): splitting a broadcast channel into a plurality of portions, the plurality of portions comprising at least primary broadcast parameters and secondary broadcast parameters, transmission bandwidth of the primary broadcast parameters is less than or equal to the transmission bandwidth of secondary broadcast parameters.

In accordance with another aspect, a microprocessor having stored theron computer executable instructions for carrying out the following act(s): splitting a broadcast channel into a plurality of portions, the plurality of portions comprising at least primary broadcast parameters and secondary broadcast parameters, transmission bandwidth of the primary broadcast parameters is less than or equal to the transmission bandwidth of secondary broadcast parameters.

In accordance with another aspect, a method that facilitates broadcast channel operation, comprising: splitting a broadcast channel into a plurality of portions, wherein a first portion is used for cell-specific parameters and a second portion comprises system specific parameters; and the first portion is broadcasted using a non-SFN mode.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

DETAILED DESCRIPTION

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, and executable, a thread of execution, a program, and/or a computer. by way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with mobile device(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., computer disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Figure 1:
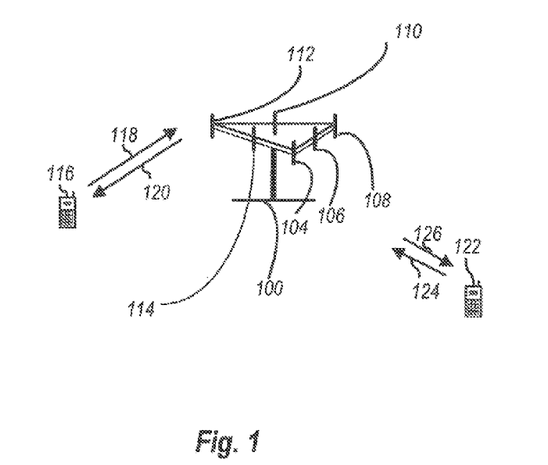
FIG. 1 is an illustration of a multiple access wireless communication system according to one embodiment.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward line 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals. An access point may be a fixed station used for communicating with the terminals and may also be referred to as an access point, a Node B, or some other terminology. A access terminal may also be called a access terminal, a user equipment (UE), a wireless communication device, terminal, access terminal or some other terminology.

Figure 2:
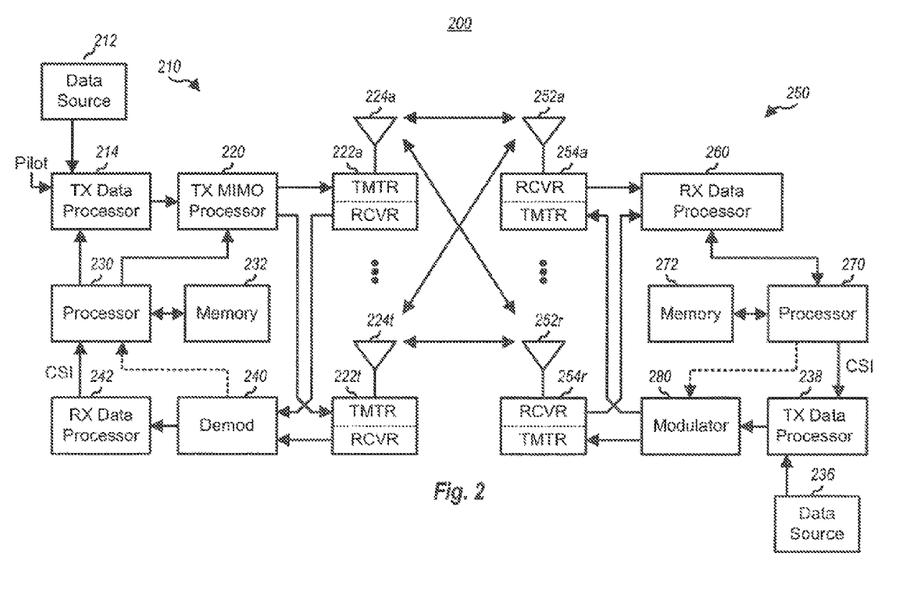
FIG. 2 is a block diagram of an example communication system.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to a transmit (TX) data for a number of data streams each data stream is transmitted over a respective transmit antenna. TX data processor 214 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a and 222t are then transmitted from $N_T$ antennas 224a through 224t, respectively. At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filter, amplified, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210. Processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
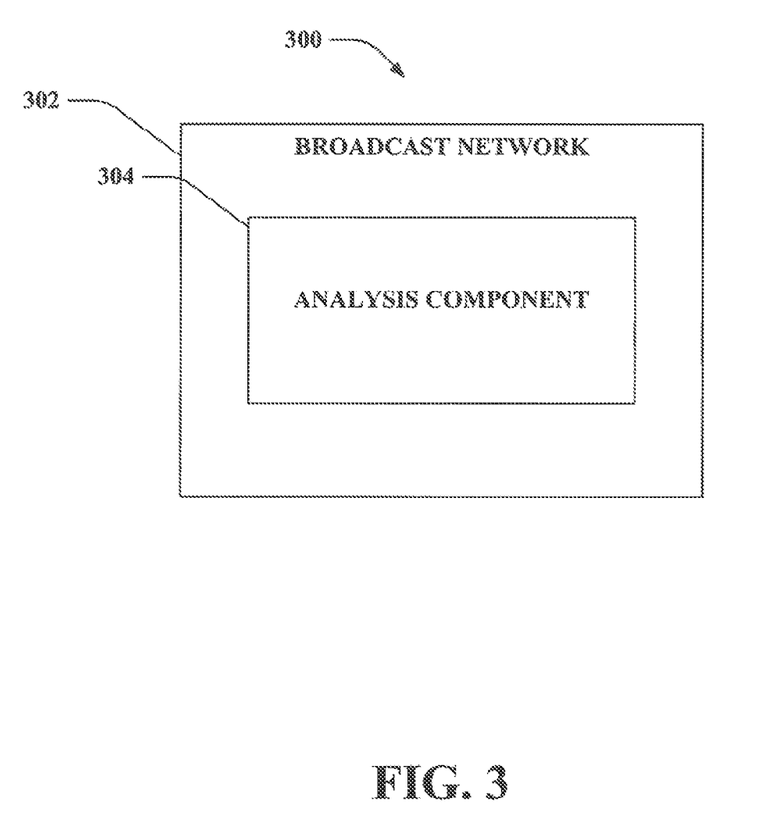
FIG. 3 is an illustration of an example system that allows for optimal transmission of system parameter data.

Referring now to FIG. 3, a wireless communications system 300 is illustrated that allows for optimal transmission of system parameter data. System 300 comprises a broadcast network 302. Broadcast network 302 can communicate with a plurality of base stations in system 300. An analysis component 304 associated with the broadcast network 302 allows for optimal transmission of system parameter data according to various factors, as will be discussed in more detail infra.

Figure 4:
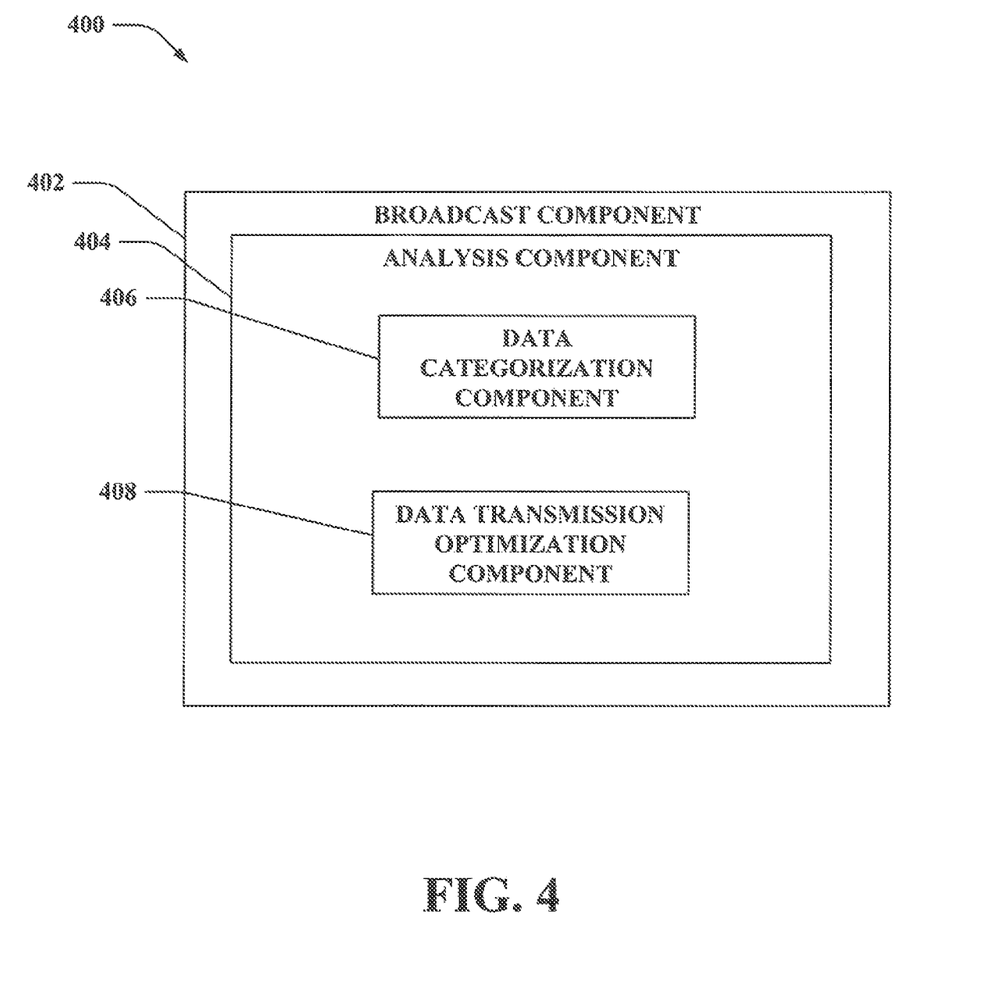
FIG. 4 is an illustration of an example system that allows for optimal transmission of system parameter data.

With reference to FIG. 4, a wireless communications system 400 is illustrated that allows for optimal transmission of system parameter data. System 400 comprises a broadcast network 402 that comprises an analysis component 404, as previously discussed with regard to FIG. 3. In one aspect, analysis component 404 further employs data categorization component 406, and data transmission optimization component 408. Data categorization component 406 classifies system parameter data as being one of system-specific and base station cell-specific. In an aspect, data categorization component 406 classifies the data by determining whether the data is one of static, semi-static, and dynamic in nature. Upon determining that parameter data is static, the data is classified as being system-specific. Data categorization component 406 determines that parameter data is static when the parameter data only changes on very large timescales (e.g., during network upgrades). In one aspect, data categorization component 406 will determine that parameter data is semi-static if the value of the data changes on the order of every tens and hundreds of milliseconds, and that data is dynamic if the value of the data changes on the order of every millisecond. It is to be appreciated that such values are given as example criteria for classifying parameter data, and that such criteria can be adjusted to reflect various timescale thresholds. Data categorization component 406 provides to data transmission optimization component 408 all the system parameter data identified as static, semi-static, and dynamic. Data transmission optimization component 408 subsequently groups the static parameter data for transmission via a primary broadcast channel (P-BCH) and the semi-static and dynamic parameter data via a secondary broadcast channel (S-BCH). Thus, data transmission optimization component 408 selectively splits a broadcast channel according to the type of system parameter data that is to be transmitted.

Figure 5:
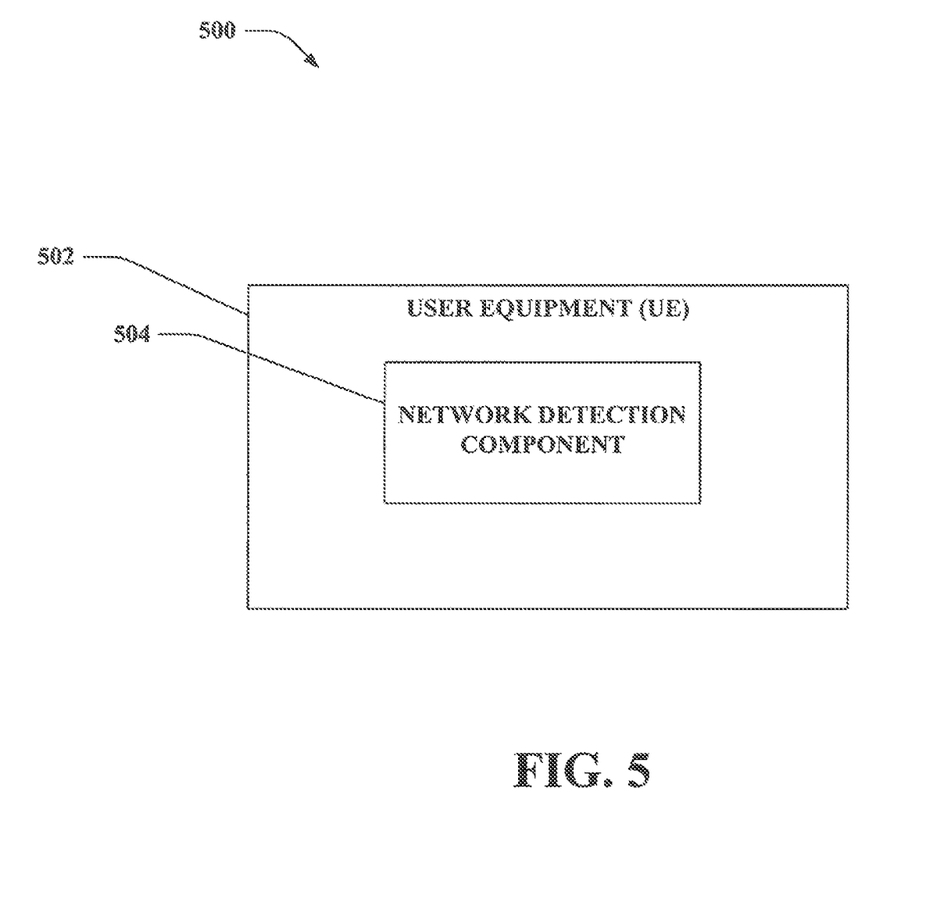
FIG. 5 is an illustration of an example system that allows for user equipment to decode the broadcast channel upon initial acquisition.

With reference now to FIG. 5, a wireless communications system 500 is illustrated that allows for a user equipment (UE) 502 to decode the broadcast channel (BCH) upon initial acquisition. After initial acquisition of the broadcast channel (BCH) through the synchronization channel (SCH), the UE must decode the BCH to determine system parameters. In an aspect, decoding of system parameters prior to the decoding of cell parameters will yield an indication of the transmission bandwidth of the cell parameters. It is to be appreciated that the UE will attempt to decode the BCH immediately after acquisition and at this stage, the overall system bandwidth is unknown. Thus, the P-BCH transmission bandwidth is set equal to the SCH transmission bandwidth. If it is later determined that the system bandwidth is greater than minimum capability, the UE might not be able to decode the P-BCH unless it performs a discontinuous reception procedure (DRX) on a fraction of the DL transmission spectrum. To optimize UE resources, for example, since system bandwidth and UE capability information are static parameters, the UE can decode the P-BCH just once upon initial acquisition. This simplifies the design and allows the UE to reach the P-BCH just once and then camp on a separate contiguous 10 MHz reception bandwidth, assuming the minimum UE RF capability is 10 MHz, for example. Transmission of the P-BCH at a high reliability can be achieved by coding over a long transmission time interval (TTI), or by utilizing a SFN operation if it is present and the associated network supports it. To this end, in one aspect, network detection component 504 determined whether a synchronous network is being employed. More particularly, for example, network detection component 504 can detect whether a SFN is being utilized. Upon determining that an SFN is being utilized, UE 502 assumes a long cyclic prefix and dense downlink reference signal structure for each orthogonal frequency-division multiplexing (OFDM) symbol used for transmitting a P-BCH. Moreover, if an SFN operation is not detected by the network detection component 504, the UE 502 assumes a short cyclic prefix and a parsed downlink reference signal structure for each OFDM symbol used for transmitting a P-BCH.

It is to be appreciated that the SFN operation cannot be used to transmit the S-BCH. However, S-BCH also needs to be transmitted for good coverage and very high reliability. Due to the cell-specific parameters of S-BCH, reliable transmission of the S-BCH is achieved by coding over a long TTL. Moreover, unlike decoding of the P-BCH, when the UE attempts to decode the S-BCH, it already knows the DL system bandwidth. Therefore, the S-BCH transmission bandwidth is not necessarily equal to the P-BCH transmission bandwidth. Moreover, if the system bandwidth is greater than minimum UE capability, the UE might not be able to decode the S-BCH unless it performs a DRX procedure on a fraction of the DL transmission spectrum. Given the semi-static nature of parameters in S-BCH, it is necessary for every UE to be able to decode the S-BCH frequently (as opposed to decoding the P-BCH just once). Therefore, in one aspect, the S-BCH is transmitted in every 10 MHz of the system bandwidth.

Various methodologies in accordance with the subject invention will now be described via a series of acts. It is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Figure 6:
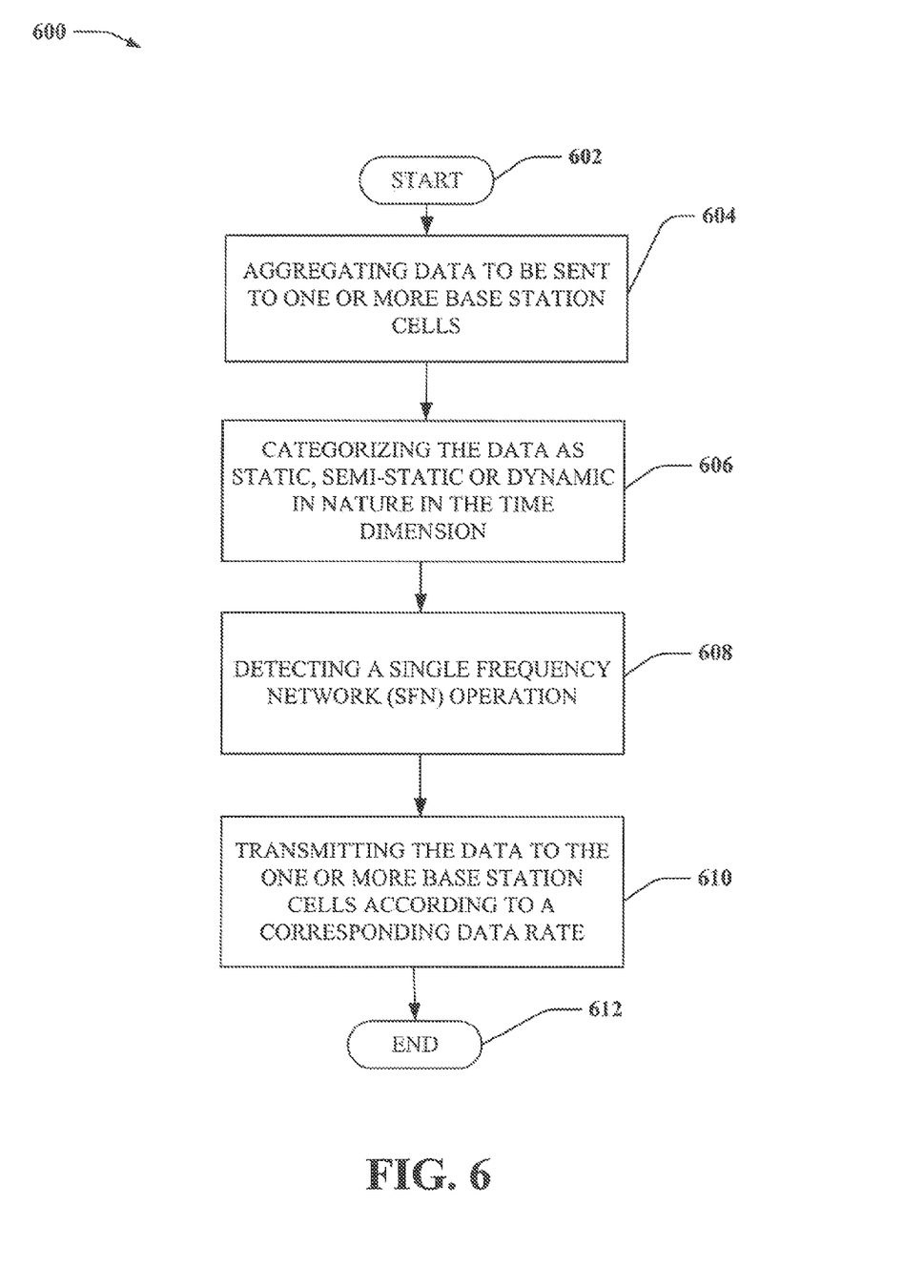
FIG. 6 is an illustration of an example methodology that allows for optimal transmission of system parameter data.

With reference now to FIG. 6, methodology 600 starts at 602 and at 604, system parameter data is aggregated at a broadcast station prior to being sent to one or more mobile systems in a wireless communications environment. It is to be appreciated that system parameter data can comprise information that is generally applicable to all base station cells within a wireless communications system and information that is specific to a singular cell. For example, information applicable to all base stations can comprise downlink/uplink system bandwidth information, conditioning pulse (CP) duration (e.g. depending on SCH design, the CP duration used for SCH may be unknown after initial acquisition, and there may be more than one CP duration in use within the system), and multimedia broadcast multiple service (MBMS) related information (e.g. absence/presence of services such as MBMS, and scrambling code ID if SFN operation is allowed on E-MBMS). System parameter data that applies to a specific cell can comprise system frame numbers, random access (RACH) related parameters (e.g. RACH signature sequences, time/frequency allocation, and persistence parameters for access load control), system information for uplink (UL) shared data channels (e.g. control related information MIMO/SDMA related information, reference signal sequence), system information for downlink (DL) shared data channels (e.g. control related information, MIMO/SDMA related information DL reference signal physical mapping), scheduling related information (e.g. sub-band information for CQI reporting, mapping of each sub-band to set of tones). It is to be further appreciated that the control related information for uplink shared data channels can comprise number of Ul assignment channels and MCS configuration of each UL assignment channel, if necessary. The MIMO/SDMA related information for uplink shared data channels can comprise number of Rx antennas and number of precoding matrices for MIMO/SDMA operation. Moreover, the control related information for DL shared data channels can include a number of DL shared control channels and MCS configuration of each DL shared control channel, if necessary. The MIMO/SDMA related information for the DL shared data channels can comprise a number of TX antennas and a number of precoding matrices for MIMO/SDMA operation.

With further reference to FIG. 6, at 606, a determination is made as to which system parameter data in question ins applicable generally to all cells within a wireless communications system or to specific cells within the system. In one embodiment, this determination relies on categorizing the system parameter data as static, semi-static and dynamic. As previously discussed, static parameter data indicates that the data is system-specific while semi-static and dynamic parameter data indicates that the data is cell-specific. At 608, a determination is made as to whether a single frequency network (SFN) is being employed. In one embodiment, if an SFN operation is detected, all cells in the wireless communications system can transmit the primary BCH at exactly the same time, since the presence of an SFN operation indicates the presence of a synchronous network. Since an SFN operation can yield a high signal to noise ratio (SNR), resulting in an optimal data transmission rate (e.g. 15-20 dB). At 610, static system parameter data is transmitted via a P-BCH to all of the one or more base station cells within the wireless communications system. Semi-static and dynamic parameter data are transmitted via a secondary broadcast channel (S-BCH).

Figure 7:
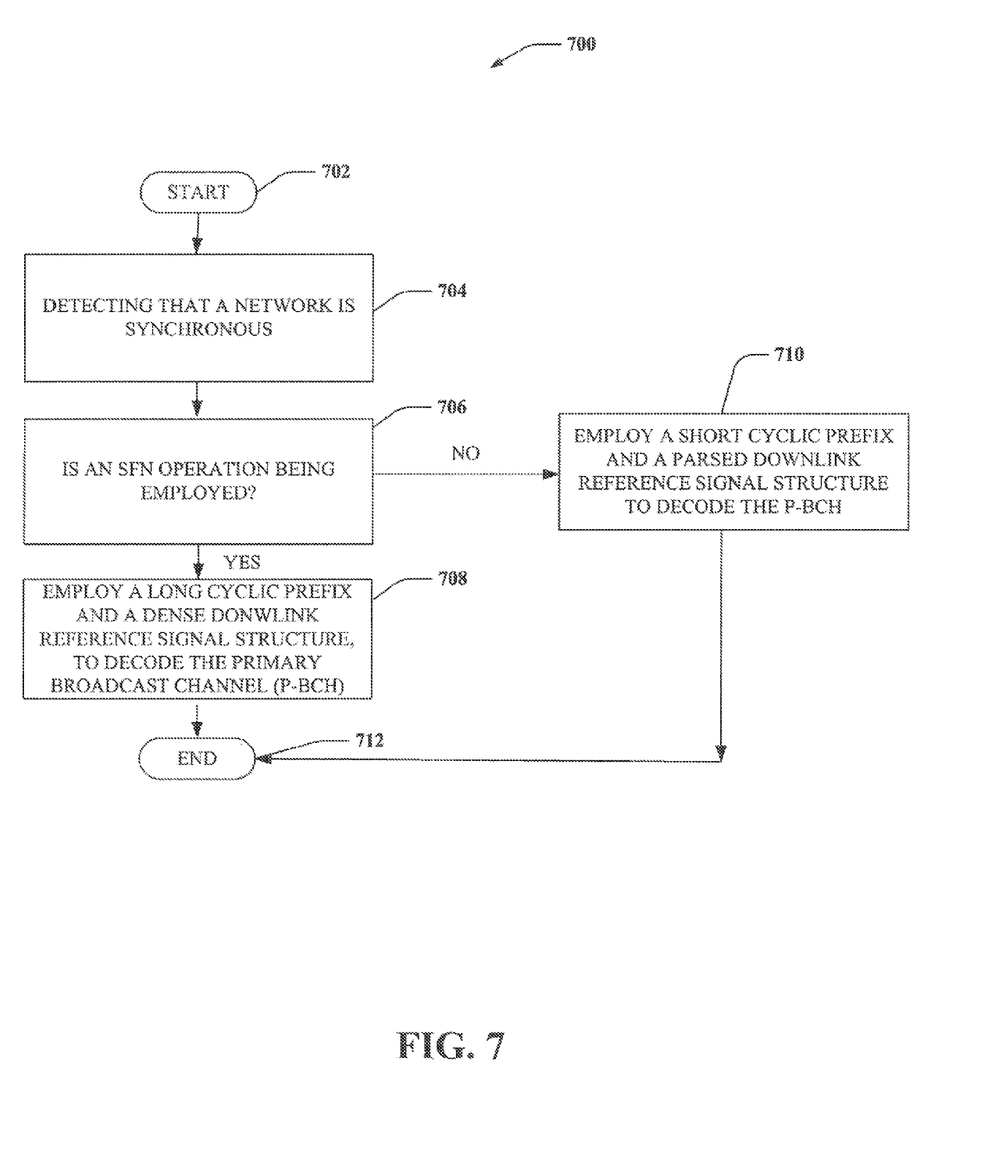
FIG. 7 is an illustration of an example methodology that allows for user equipment to decode the broadcast channel upon initial acquisition.

Referring now to FIG. 7, a methodology 700 is illustrated that allows for a UB to optimally decode data received via the P-BCH depending upon the type of network that is detected. The methodology 700 starts at 702 and at 704 upon powering on the UE, a determination is made that the access network is synchronous in nature. In one aspect, for example, at 706, if the access network is found to be synchronous, the UE accesses time information and determines whether an SFN operation is present. In this way, at 708, the UE can automatically employ a longer cyclic prefix for decoding the P-BCH upon detection of a SFN operation at 706. If an SFN operation is not detected at 706, the UE employs a short cyclic prefix and a parsed downlink reference structure signal to decode the P-BCH at 710.

Figure 8:
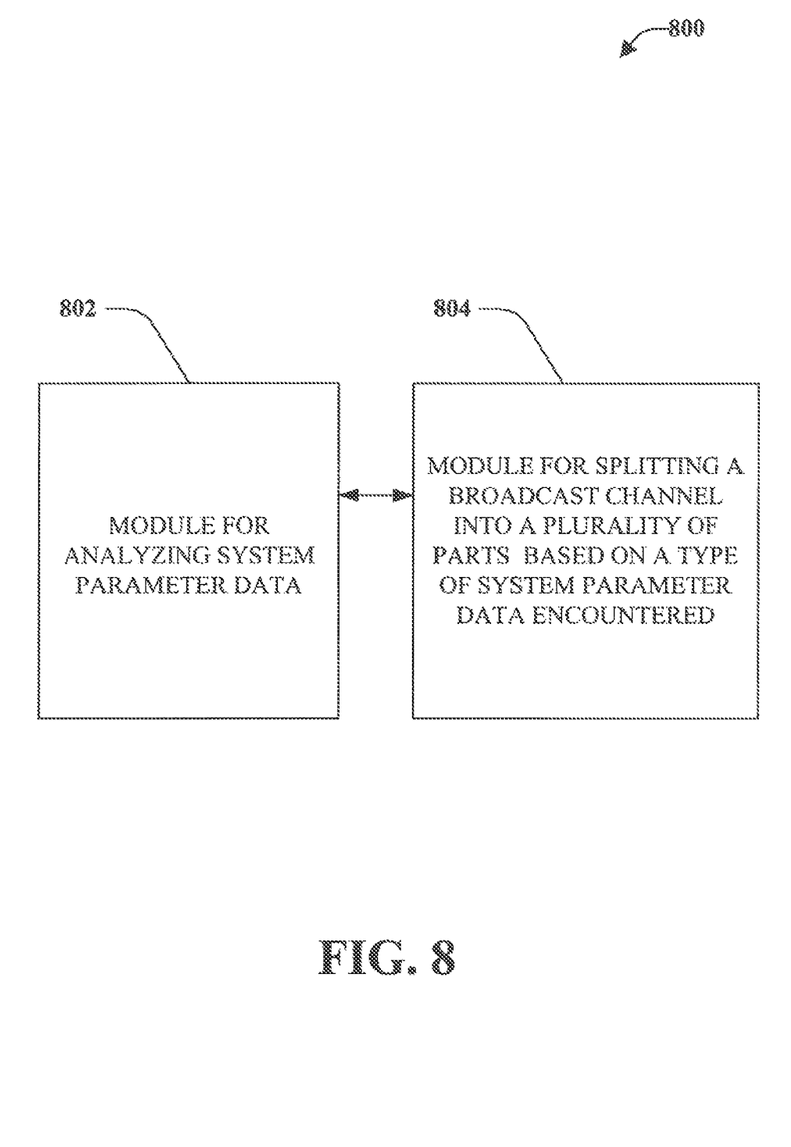
FIG. 8 is a block diagram of a system that facilitates optimal transmission of system parameter data.

Referring now to FIG. 8, a system 800 that facilitates broadcast channel operation is illustrated. System 800 can include a module 802 for analyzing system parameter data. In one aspect, for example, such analysis can comprise determining whether the parameter data is static, semi-static or dynamic in nature. According to this determination, the module 804 can split the broadcast channel such that static parameter data can be transmitted at an optimal data rate.

Figure 9:
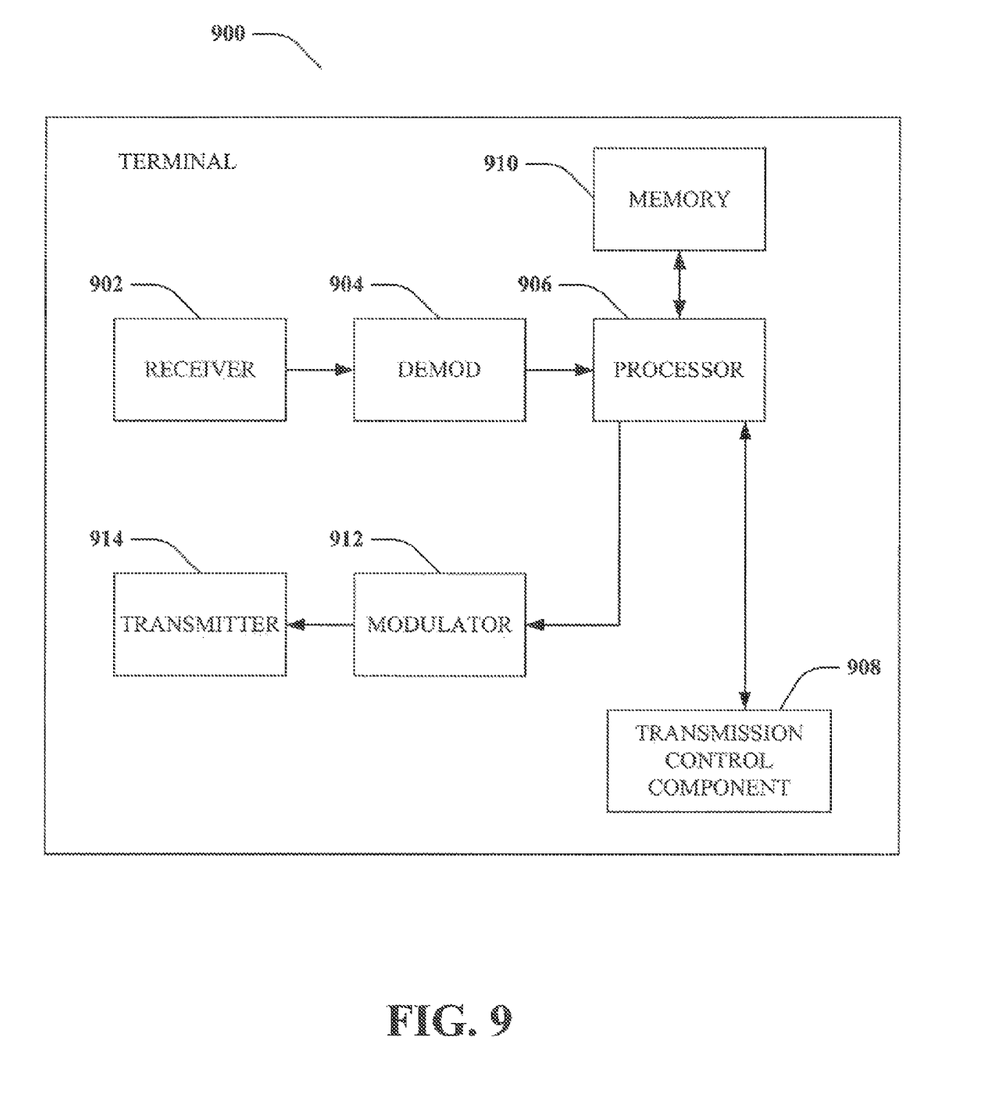
FIG. 9 illustrates a system that provides for other sector communication in accordance with one or more aspects presented herein.

FIG. 9 is an illustration of a terminal or user device 900 that provides for other sector communication in a wireless communication environment in accordance with one or more aspects set forth herein. Terminal 900 comprises a receiver 902 that receives a signal, for instance one or more receive antennas, and performs typical actions (e.g., filters, amplifies, downconverts, etc.) the received signal and digitizes the conditioned signal to obtain samples. A demodulator 904 can demodulate the samples and provide received pilot symbols to a processor 906.

Processor 906 can be a processor dedicated to analyzing information received by receiver component 902 and/or generating information for transmission by a transmitter 914.

Processor 906 can be a processor that controls one or more components of terminal 900, and/or a processor that analyzes information received by receiver 902, generates information for transmission by a transmitter 914, and controls one or more components of terminal 900. Processor 906 can utilize any of the methodologies described herein, including those described with respect to FIGS. 6 and 7.

In addition, terminal 900 can include a transmission control component 908 that analyzes received input, including acknowledgments of successful transmissions. Acknowledgements (ACK) can be received from the serving sector and/or a neighboring sector. Acknowledgement can indicate that a previous transmission has been successfully received and decoded by one of the access points. If no acknowledgement is received, or if a negative acknowledgement (NAK) is received, the transmission can be resent. Transmission control component 908 can be incorporated into the processor 906. It is to be appreciated that transmission control component 908 can include transmission control code that performs analysis in connection with determining receipt of acknowledgement.

Terminal 900 can additionally comprise memory 910 that is operatively coupled to processor 906 and that can store information related to transmissions, an active set of sectors, methods for controlling transmissions, lookup tables comprising information related thereto, and any other suitable information related to transmission and active set sectors as described herein. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 910 of the subject systems and methods is intended to comprise, without being limited to, these and any other suitable types of memory. Processor 906 is connected to a symbol modulator 912 and transmitter 914 that transmits the modulated signal.

Figure 10:
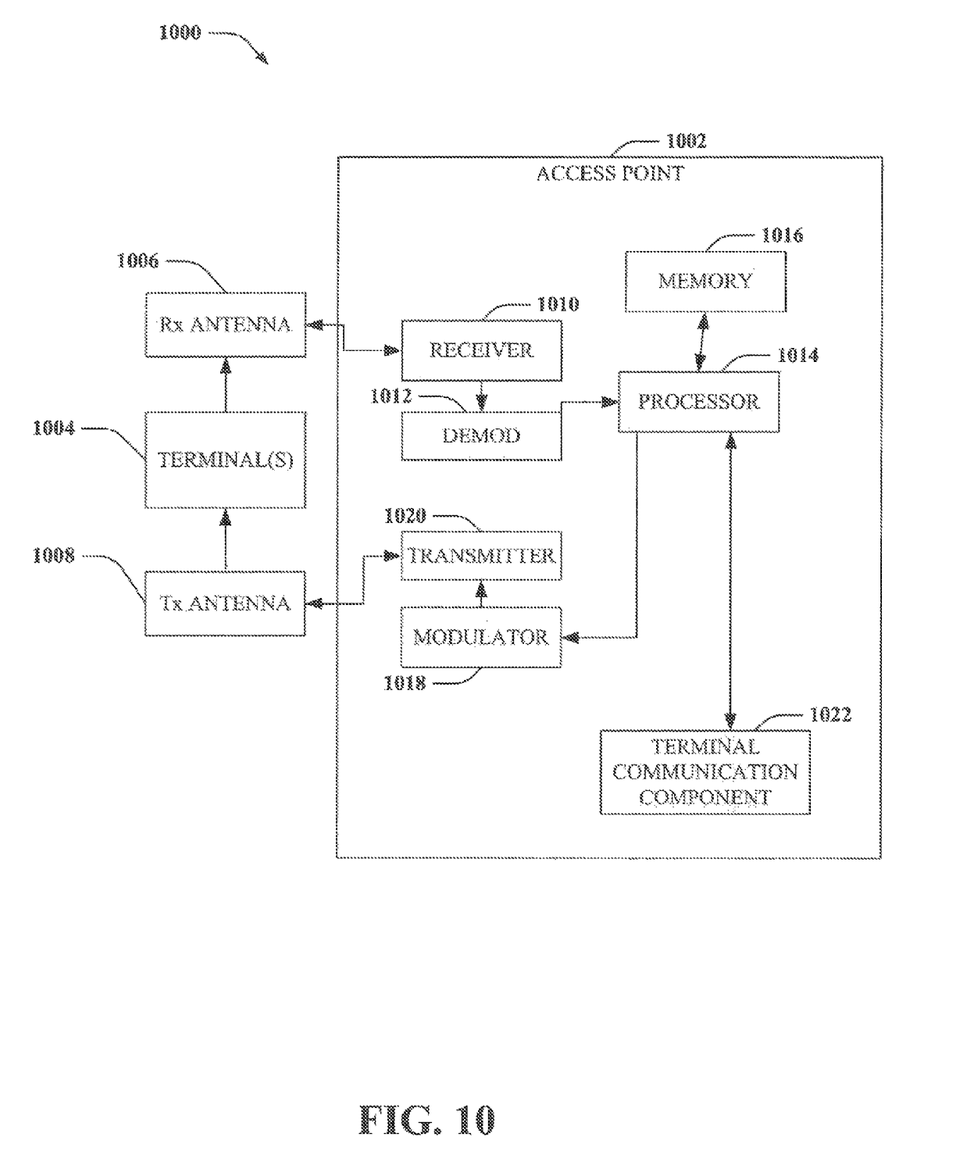
FIG. 10 illustrates a system that provides for processing reverse link communications at a non-serving sector of a terminal in accordance with one or more aspects presented herein.

FIG. 10 is an illustration of a system 1000 that facilitates other sector communication in a communications environment in accordance with various aspects. System 1000 comprises an access point 1002 with a receiver 1010 that receives signal(s) from one or more terminals 1004 through one or more receive antennas 1006, and transmits to the one or more terminals 1004 through a plurality of transmit antennas 1008. Terminals 1004 can include those terminals supported by the access point 1002, as well as terminals 1004 supported by neighboring sectors. In one or more aspects, receive antennas 1006 and transmit antennas 1008 can be implemented using a single set of antennas. Receiver 1010 can receive information from receive antennas 1006 and is operatively associated with a demodulator 1012 that demodulates received information. Receiver 1010 can be, for example, an MMSE-based receiver, or some other suitable receiver for separating out terminals assigned thereto, as will be appreciated by one skilled in the art. According to various aspects, multiple receivers can be employed (e.g., one per receive antenna), and such receivers can communicate with each other to provide improved estimates of user data. Demodulated symbols are analyzed by a processor 1014 that is similar to the processor described above with regard to FIG. 9, and is coupled to a memory 1016 that stores information related to terminals, assigned resources associated with terminals and the like. Receiver output for each antenna can be jointly processed by receiver 1010 and/or processor 1014. A modulator 1018 can multiplex the signal for transmission by a transmitter 1020 through transmit antennas 1008 to terminals 1004.

Access point 1002 further comprises a terminal communication component 1022, which can be a processor distinct from, or integral to, processor 1014. Terminal communication component 1022 can obtain resource assignment information for terminals supported by neighboring sectors. In addition, terminal communication component 1022 can provide assignment information to neighboring sectors for terminals supported by access point 1002. Assignment information can be provided via backhaul signaling.

Based upon information regarding assigned resources, terminal communication component 1022 can direct detection of transmissions from terminals supported by neighboring sectors, as well as decoding of received transmissions. Memory 1016 can maintain packets received from terminals prior to receipt of the assignment information necessary for decoding of packets. Terminal communication component 1022 can also control transmission and receipt of acknowledgements indicating successful reception and decoding of transmissions. It is to be appreciated that terminal communication component 1022 can include transmission analysis code that performs utlity based control in connection with assigning resources, identifying terminals for soft handoff, decoding transmission and the like. The terminal analysis code can utilize artificial intelligence based methods in connection with performing inference and/or probabilistic determinations and/or statistical-based determinations in connection with optimizing terminal performance.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates broadcast channel operation, comprising:
    splitting a broadcast channel into a plurality of portions, the plurality of portions comprising at least primary broadcast parameters and secondary broadcast parameters, transmission bandwidth of the primary broadcast parameters being less than or equal to transmission bandwidth of secondary broadcast parameters; and
    broadcasting the primary and secondary broadcast parameters over the broadcast channel.

2. The method of claim 1, wherein a user equipment (UE) decodes the primary broadcast parameters prior to decoding the secondary broadcast parameters, decoding of the primary broadcast parameters providing an indication of the transmission bandwidth of the secondary broadcast parameters.

3. The method of claim 1, wherein the primary broadcast parameters primarily comprise system parameters and the secondary broadcast parameters primarily comprise cell parameters.

4. The method of claim 3, wherein the primary broadcast parameters are transmitted via a single frequency network (SFN) mode.

5. The method of claim 3, wherein the secondary broadcast parameters are transmitted via a non-SFN mode.

6. The method of claim 5, wherein the non-SFN mode is a cell-specific mode.

7. The method of claim 1, wherein a cyclic prefix is treated as static information.

8. The method of claim 1, wherein system specific parameters are treated as static information.

9. The method of claim 1, wherein cell specific features are treated as semi-static or dynamic.

10. The method of claim 3, wherein the system parameters are sent in a primary broadcast channel (P-BCH).

11. The method of claim 3, wherein the cell parameters are sent in a secondary broadcast channel (S-BCH).

12. The method of claim 10, wherein the primary broadcast channel is sent over an entire system.

13. The method of claim 12, wherein all cells of the system concurrently transmit the P-BCH.

14. The method of claim 13, wherein the system is a synchronous network.

15. The method of claim 1, further comprising optimizing data rate transmission via transmitting system information separate from cell specific information.

16. The method of claim 15, wherein the system information comprises uplink and downlink system bandwidth information.

17. The method of claim 15, wherein the system information comprises cyclic prefix duration information.

18. The method of claim 15, wherein the system information comprises multi-media broadcast multicast service information.

19. The method of claim I, wherein if a user equipment (UE) detects SFN operation, the UE assumes a known longer cyclic prefix duration and a known dense DL reference signal structure for each OFDM symbol used for transmitting a primary broadcast channel (P-BCH).

20. The method of claim 11, wherein the S-BCH is transmitted in every 10 MHz of the system bandwidth.

21. The method of claim 11, further comprising transmitting data classified as uncertain on the S-BCH.

22. A system that facilitates broadcast channel operation, comprising:
    means for analyzing data to be transmitted; and
    means for splitting a broadcast channel into a plurality of portions, the plurality of portions comprising at least primary broadcast parameters and secondary broadcast parameters, transmission bandwidth of the primary broadcast parameters being less than or equal to transmission bandwidth of secondary broadcast parameters.

23. The system of claim 22, further comprising means for optimizing data rate transmission via transmitting system information separate from cell specific information.

24. A microprocessor having stored thereon computer executable instructions for carrying out the following act(s):
    splitting a broadcast channel into a plurality of portions, the plurality of portions comprising at least primary broadcast parameters and secondary broadcast parameters, transmission bandwidth of the primary broadcast parameters being less than or equal to transmission bandwidth of secondary broadcast parameters.

25. The microprocessor of claim 24, wherein a user equipment (UE) decodes the primary broadcast parameters prior to decoding the secondary broadcast parameters, decoding of the primary broadcast parameters providing an indication of the transmission bandwidth of the secondary broadcast parameters.

26. The microprocessor of claim 24, wherein the primary broadcast parameters primarily comprise system parameters and the secondary broadcast parameters primarily comprise cell parameters.

27. The microprocessor of claim 26, wherein the primary broadcast parameters are transmitted via a SFN mode.

28. The microprocessor of claim 26, wherein the secondary broadcast parameters are transmitted via a non-SFN mode.

29. The microprocessor of claim 24, the act(s) further comprising optimizing data rate transmission via transmitting system information separate from cell specific information.

30. The microprocessor of claim 24, the act(s) further comprising further comprising transmitting data classified as uncertain on the S-BCH.

31. A method that facilitates broadcast channel operation, comprising:
    splitting a broadcast channel into a plurality of portions, wherein a first portion is used for cell-specific parameters and a second portion comprises system specific parameters; and
    broadcasting the first portion using a non-SFN mode.

32. A method for receiving broadcast information, comprising:
    receiving information over a broadcast channel, wherein the broadcast channel is split into a plurality of portions, the plurality of portions comprising at least primary broadcast parameters and secondary broadcast parameters, transmission bandwidth of the primary broadcast parameters being less than or equal to transmission bandwidth of secondary broadcast parameters; and
    decoding the primary broadcast parameters prior to decoding the secondary broadcast parameters, wherein decoding of the primary broadcast parameters provides an indication of the transmission bandwidth of the secondary broadcast parameters.

33. The method of claim 32, wherein the primary broadcast parameters primarily comprise system parameters and the secondary broadcast parameters primarily comprise cell parameters.

34. The method of claim 32, wherein the primary broadcast parameters are transmitted via a single frequency network (SFN) mode.

35. The method of claim 32, wherein the secondary broadcast parameters are transmitted via a non-single frequency network (SFN) mode.

36. A method for broadcast channel operation, comprising:
    splitting a broadcast channel into a plurality of portions, the plurality of portions comprising at least primary broadcast parameters and secondary broadcast parameters, wherein the primary broadcast parameters comprise system parameters and the secondary broadcast parameters comprise cell parameters.

37. The method of claim 36, wherein a transmission bandwidth of the primary broadcast parameters is different from a transmission bandwidth of the secondary broadcast parameters.

38. The method of claim 36, wherein a transmission bandwidth of the primary broadcast parameters is equal to a transmission bandwidth of the secondary broadcast parameters.

39. A method for receiving broadcast information, comprising:
  receiving information over a broadcast channel, wherein the broadcast channel is split into a plurality of portions, the plurality of portions comprising at least primary broadcast parameters and secondary broadcast parameters, the primary broadcast parameters comprising system parameters and the secondary broadcast parameters comprising cell parameters.

40. The method of claim 39, wherein the primary broadcast parameters and/or the secondary broadcast parameters are received via a single frequency network (SFN) mode.

41. The method of claim 39, wherein a transmission bandwidth of the primary broadcast parameters is different from a transmission bandwidth of secondary broadcast parameters.

42. The method of claim 39, wherein a transmission bandwidth of the primary broadcast parameters is equal to a transmission bandwidth of secondary broadcast parameters.

43. A non-transitory computer readable medium having stored thereon computer executable instructions for carrying out the following act(s):
  splitting a broadcast channel into a plurality of portions, the plurality of portions comprising at least primary broadcast parameters and secondary broadcast parameters, transmission bandwidth of the primary broadcast parameters being less than or equal to transmission bandwidth of secondary broadcast parameters.

44. A system that facilitates broadcast channel operation, comprising:
  means for splitting a broadcast channel into a plurality of portions, the plurality of portions comprising at least primary broadcast parameters and secondary broadcast parameters, wherein the primary broadcast parameters comprise system parameters and the secondary broadcast parameters comprise cell parameters; and
  means for broadcasting the primary and secondary broadcast parameters over the broadcast channel.

45. A microprocessor having stored thereon computer executable instructions for carrying out the following act(s):
  splitting a broadcast channel into a plurality of portions, the plurality of portions comprising at least primary broadcast parameters and secondary broadcast parameters, wherein the primary broadcast parameters comprise system parameters and the secondary broadcast parameters comprise cell parameters.

46. A non-transitory computer readable medium having stored thereon computer executable instructions for carrying out the following act(s):
  splitting a broadcast channel into a plurality of portions, the plurality of portions comprising at least primary broadcast parameters and secondary broadcast parameters, wherein the primary broadcast parameters comprise system parameters and the secondary broadcast parameters comprise cell parameters.

47. A system that facilitates receiving broadcast information, comprising:
  means for receiving information over a broadcast channel, wherein the broadcast channel is split into a plurality of portions, the plurality of portions comprising at least primary broadcast parameters and secondary broadcast parameters, the primary broadcast parameters comprising system parameters and the secondary broadcast parameters comprising cell parameters: and
  means for processing the primary and secondary broadcast parameters.

48. A microprocessor having stored thereon computer executable instructions for carrying out the following act(s):
  receiving information over a broadcast channel, wherein the broadcast channel is split into a plurality of portions, the plurality of portions comprising at least primary broadcast parameters and secondary broadcast parameters, the primary broadcast parameters comprising system parameters and the secondary broadcast parameters comprising cell parameters.

49. A non-transitory computer readable medium having stored thereon computer executable instructions for carrying out the following act(s):
  receiving information over a broadcast channel, wherein the broadcast channel is split into a plurality of portions, the plurality of portions comprising at least primary broadcast parameters and secondary broadcast parameters, the primary broadcast parameters comprising system parameters and the secondary broadcast parameters comprising cell parameters.

* * * * *